United States Patent [19]

Tetenbaum et al.

[11] 4,436,862
[45] Mar. 13, 1984

[54] THERMALLY STABLE THICKENER

[75] Inventors: Marvin T. Tetenbaum, Wexford, Pa.; Burlon C. Crowley, Toms River, N.J.

[73] Assignee: NL Industries, Inc., New York, N.Y.

[21] Appl. No.: 504,156

[22] Filed: Jun. 14, 1983

[51] Int. Cl.³ ............................................. C08K 3/34
[52] U.S. Cl. ................................... 524/445; 524/446; 524/447; 524/450; 524/591
[58] Field of Search ................ 524/445, 446, 447, 450

[56] References Cited

U.S. PATENT DOCUMENTS 3,923,926 12/1975 Harada et al. ......................... 528/77
4,351,754 9/1982 Dupre ................................. 524/446
4,365,030 12/1982 Oswald et al. ....................... 524/445
4,412,018 10/1983 Finlayson et al. .................. 524/445

Primary Examiner—Lewis T. Jacobs

[57] ABSTRACT

A thermally stable thickener is composed of a stabilizing agent and a water dispersible polyurethane. The stabilizing agent is a smectite-type clay having a cation exchange capacity of at least 75 milliequivalents per 100 grams of clay, 100% active clay basis. The water dispersible polyurethane must possess the property that it forms an aqueous composition that experiences a decrease in Stormer viscosity upon thermal aging. Aqueous compositions incorporating the thermally stable thickener may be exposed to extended periods at elevated temperatures without substantially affecting the level of thickening.

30 Claims, No Drawings

4,436,862

THERMALLY STABLE THICKENER

BACKGROUND OF THE INVENTION

Field of the Invention

The present invention relates to a thermally stable thickener comprised of a water dispersible polyurethane and a stabilizing agent. The present invention also relates to a thermally stable thickened aqueous composition and a method of preparing the thickened aqueous composition.

2. Description of the Prior Art

It has long been known in the art to use various materials to thicken an aqueous system. Depending on the composition of the aqueous system, the gels produced with these thickeners are useful as decorative and protective coatings, paper coatings, cosmetics and personal care items, adhesives and sealants, inks, petroleum drilling fluids, packer fluids, and the like.

The thickener serves several roles in aqueous systems. In latex decorative coatings, for instance, the thickener may provide improved stability and pigment suspension, and improved application properties. In cosmetics and personal care items, the thickener will improve body, smoothness and silkiness, thereby making the product more aesthetically pleasing In petroleum drilling fluids, the thickener improves the suspension of the cuttings, thereby increasing the efficiency with which they can be removed.

Many thickeners, both natural and synthetic, are known in the art. However, all suffer from some disadvantage that limits their usage. Natural thickeners, for instance, include casein, alginates, gum tragacanth, and modified cellulose, including methyl cellulose, hydroxyethyl cellulose, hydroxypropyl cellulose, and carbomethoxy cellulose. These natural products vary in their thickening efficiency, and provide poor flow and leveling properties. Further, they are subject to microbial attack which requires the additional presence of antimicrobial agents.

Synthetic thickeners include various acrylic polymers and maleic anhydride copolymers. Some of these are found to be pH dependent, others are hydrolytically unstable, and others are sensitive to various components normally found in aqueous coatings.

One type of synthetic thickener is a low molecular weight polyurethane characterized by at least three hydrophobic groups interconnected by hydrophilic polyether groups as disclosed in U.S. Pat. Nos. 4,079,028 and 4,155,892. The polyurethane is prepared by reacting at least one water soluble polyether polyol with at least one monofunctional hydrophobic organic compound selected from monofunctional active hydrogen compounds and organic monoisocyanates. There may also be present in the reaction mixture at least one water insoluble organic polyisocyanate or at least one polyhydric alcohol or polyhydric alcohol ether. The use of a related polyurethane in combination with a surfactant cothickener and a non-aqueous, inert organic diluent to thicken print paste is set forth in U.S. Pat. No. 4,180,491.

Another type of a urethane rheology modifier which is useful in water and organic solvent based compositions is disclosed in U.S. Pat. No. 4,298,511. The rheology modifier is the reaction product of a polyalkylene oxide, a polyfunctional material having at least 3 active hydrogens or at least 3 isocyanate groups, a diisocyanate and water. The reactants are selected such that there are no terminal hydrophobic groups in the rheology modifier.

A urethane thixotropic agent for coating compositions is set forth in U.S. Pat. No. 4,314,924. The thixotropic agent is prepared by reacting a mono-hydroxy compound with a diisocyanate to form a mono-isocyanate adduct. The adduct is then converted into a urea-urethane by reaction with a polyamine in an aprotic solvent in the presence of lithium chloride.

One drawback associated with polyurethane thickeners, as well as other of the thickeners discussed previously, is their failure to maintain the desired level of thickening after exposure to heat. When subjected to high temperatures often encountered in warehouses, vehicles, attics and other exposed and semi-exposed areas, the characteristics of the thickened composition can irreversibly be altered such that they are completely different from those originally prepared by the manufacturer.

Polyurethanes, per se, have long been known in the art for various uses ranging from fibers, to coatings, to foams. For example, in U.S. Pat. No. 3,923,926, a thixotropic polyurethane is prepared by reacting a polyurethane prepolymer having at least two terminal free isocyanate groups and a block polyether compound formed from ethylene oxide and propylene oxide and having at least two terminal secondary alcohol groups. To enhance the thixotropic property, finely divided silica or bentonite may be added.

In order to render the polyurethane insoluble in water and other types of solvents, diamines, dicarboxylic acids and other materials have been used as cross-linking agents. Illustrative of the art disclosing the use of cross-linking agents are J. M. Buist and H. Gudgeon's "Advance in Polyurethane Technology", pages 49 ff, the "Encyclopedia of Polymer Science and Technology", Volume II, pp. 55 ff and 527 and Bernard A. Dunbrow's "Polyurethanes, Second Edition", p. 28.

A further example of a cross-linked polyurethane is disclosed in U.S. Pat. No. 4,293,679. In that patent, solid, discrete, hydrophilic, cross-linked polyurethane particles are formed from a composition which comprises: (a) a water reactant; (b) a defined isocyanate capped prepolymer; (c) a water soluble solvent for (b); and (d) when the reaction functionality of (b) is two, a cross-linking agent containing at least three functional groups.

A different type of cross-linked polyester-urethane is described in U.S. Pat. No. 3,804,810. The polymer is prepared by reacting (a) a defined linear polyester, (b) at least one organic diisocyanate, and (c) at least one cross-linking agent having a functionality greater than 2. The cross-linked polyester-urethane is stated as being useful as adhesives, coating compositions, primers, and for binding magnetic and/or conductive particles to a suitable support.

Despite the activity in the art, there has not been produced a thermally stable thickener which is useful for increasing the viscosity and improving the leveling characteristics of an aqueous composition in an efficient manner which is consistent over a wide range in temperature.

OBJECTS AND SUMMARY OF THE INVENTION

Accordingly, it is a general object of the present invention to solve or substantially alleviate the noted problems in the art.

It is a more specific object of the present invention to provide a thermally stable thickener which is useful for increasing the viscosity of an aqueous composition in an efficient manner.

It is another object of the present invention to provide a thermally stable thickener which improves the flow and leveling characteristics of an aqueous composition.

It is another object of the present invention to provide a thermally stable thickener which resists microbial attack.

It is another object of the present invention to provide a thermally stable thickener comprised of a water dispersible polyurethane and a stabilizing agent.

It is a further object of the present invention to provide a thermally stable, thickened aqueous composition which comprises water, a water dispersible polyurethane and a stabilizing agent.

It is a still further object of the present invention to provide a method of thickening aqueous compositions.

In one aspect, the present invention provides a thermally stable thickener comprised of:

(a) a stabilizing agent which is at least one smectite-type clay having a cation exchange capacity of at least 75 milliequivalents per 100 grams of clay, 100% active clay basis; and (b) a water dispersible polyurethane which, when mixed into an aqueous composition alone, results in a thickened aqueous composition that exhibits a decrease in room temperature Stormer viscosity after one month at 140° F., said stabilizing agent and said water dispersible polyurethane being in a dry weight ratio in the range of from 1:9 to 9:1.

In other aspects, the present invention provides a thermally stable, thickened aqueous composition and a method of increasing the viscosity and improving the leveling characteristics of an aqueous composition by employing a thermally stable thickener.

Further advantages and features of the invention as well as the scope, nature and utilization of the invention, will become apparent to those skilled in the art from the following description of the preferred embodiments of the invention.

DESCRIPTION OF THE PREFERRED EMBODIMENTS

As stated hereinabove, the present invention relates to a thermally stable thickener. The thickener is comprised of a defined stabilizing agent and a defined water dispersible polyurethane in a dry weight ratio of 1:9 to 9:1, preferably from about 2:3 to about 3:15 and most preferably from about 3:7 to about 1:4. The term "dry weight" is used to indicate that while the thickener may be used in solid or liquid (e.g., as a slurry) form, the amounts of the stabilizing agent and the water dispersible polyurethane are determined in the absence of a liquid diluent, carrier or solvent.

The polyurethane of the present invention must meet certain criteria. Specifically, the polyurethane must first be water dispersible in that the polymer readily disperses in most aqueous systems in an amount in the range of from about 0.005 to about 10.00% by weight to form a colloidal dispersion. The dispersion must not separate upon standing despite being subjected to the range of ambient temperatures which the thickened aqueous composition will experience.

Additionally, the polyurethane of the present invention must possess the property that when it is incorporated into an aqueous composition in amounts ranging from about 0.005 to about 10.00% by weight, the composition experiences a decrease in viscosity when exposed to heat for a prolonged period. To determine whether a particular polyurethane satisfies this criterion, the polyurethane is dispersed in an aqueous composition and the viscosity of the composition (in Krebs Units) is determined at room temperature after one day using a Stormer viscometer at low shear conditions according to ASTM D562-55. The composition is then aged for one month at 140° F. At the end of this time, the composition is cooled to room temperature and the Stormer viscosity is again determined. If the viscosity of the aged composition is less than that of the original viscosity, for example, by at least 3 Krebs Units, and usually more such as at least 6 or 11 Krebs Units, the polyurethane satisfies this criterion.

Polyurethanes useful in the present invention include those prepared by reacting a polyisocyanate with a polyether polyol under conditions well known to those of ordinary skill in the art. For example, the polyurethane may be prepared by reacting a low molecular weight polyisocyanate terminated prepolymer with a polyether polyol or by reacting such a prepolymer and/or a polyisocyanate with a low molecular weight polyhydroxyl terminated polyurethane prepolymer. Preferably, the polyurethane is capped with a monofunctional material to ensure that the polyurethane does not further react and potentially lose its ability to be dispersed in water.

Whatever polyurethane is employed, it must satisfy the criteria described above. For example, the polyisocyanate or the polyisocyanate prepolymer and the polyether polyol or polyol prepolymer must not lead to a polyurethane which is cross-linked to the extent that it cannot be dispersed in an aqueous composition. Moreover, an aqueous composition incorporating the polyurethane must exhibit a decrease in Stormer Viscosity upon thermal aging as explained previously.

One polyurethane which can satisfy the stated criteria is the modified polyurethane described in commonly assigned U.S. patent application Ser. No. 491,039 by Marvin T. Tetenbaum and Burlon C. Crowley entitled: "Water Dispersible, Modified Polyurethane", the contents of which are incorporated by reference. As explained in that application, the modified polyurethane is prepared by reacting a polyisocyanate, a polyether polyol and a modifying agent to yield an intermediate which is capped with a capping agent. Unless otherwise indicated, the term "polyurethane" used herein encompasses such modified polyurethanes as well as non-modified polyurethanes.

The polyisocyanate used to prepare the polyurethane contains at least two isocyanate groups per molecule and may be linear or branched aliphatic, cycloaliphatic or aromatic. The polyisocyanate may also be in the form of an isocyanate-terminated prepolymer having an average molecular weight in the range of from about 500 to about 10,000. The preparation of such a prepolymer is well known in the art as demonstrated by aforementioned U.S. Pat. No. 3,923,926, the contents of which are incorporated by reference.

The polyisocyanate preferably contains two isocyanate moieties per molecule. Higher functionality polyisocyanates may be used as a portion of the total isocyanate requirement. However, the use of higher functionality polyisocyanates is limited by the possibility of the formation of a cross-linked, insoluble gel which is unsuitable for purposes of the present invention. Tri and higher functional polyisocyanates, if used, generally constitute less than 20 mole % of the total isocyanate minimum requirement. Preferably, tri and higher functional polyisocyanate constitute less than 10 mole % and, most preferably, they are absent from the polyisocyanate.

Exemplary polyisocyanates useful in the preparation of polyurethanes of this invention are 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexylene diisocyanate, 4,4'-methylenebis-(isocyanatocyclohexane), 1-isocyanato-3-isocyanatomethyl-3,5,5-trimethylcyclohexane, m- and p-phenylene diisocyanate, 2,6- and 2,4-tolylene diisocyanate, xylene diisocyanate, 4-chloro-1,3-phenylene diisocyanate, 4,4'-biphenylene diisocyanate, 4,4-methylene diphenylisocyanate, 1,5-naphthylene diisocyanate, 1,5-tetrahydronaphthylene diisocyanate, polymethylene polyphenyl-isocyanates sold under the brand name "PAPI," such as "PAPI 135" (equivalent weight of 133.5 and average isocyanate functionality of 2.7) and "PAPI 901" (equivalent weight of 133 and average isocyanate functionality of 2.3), aromatic triisocyanate adduct of trimethylol propane and tolylene diisocyanate sold under the brand name "Mondur CB-75", aliphatic triisocyanate product of the hydrolytic trimerization of 1,6-hexamethylene diisocyanate, sold under the brand name "Desmodur N", $C_{36}$ dimer acid diisocyanate sold under the brand name "DDI", based on dimer acids as discussed in J. Am. Oil Chem. Soc. 51,522 (1974) and mixtures thereof.

The preferred polyisocyanates are 1,6-hexamethylene diisocyanate, 1-isocyanato-3-isocyanatomethyl-3,5,5-trimethyl cyclohexane, the 2,6- and 2,4-tolylene diisocyanates and mixtures thereof. Most preferred are the two tolylene diisocyanate isomers or mixtures thereof.

It is to be understood that the polyisocyanate molecule may contain functional moieties other than isocyanate if these additional moieties are substantially unreactive with either the isocyanate or the active hydrogen groups under the reaction conditions for the preparation of the polyurethane of this invention. Consistent with this understanding, the term "polyisocyanate" and the named polyisocyanates encompass such materials unless otherwise indicated. Exemplary moieties which do not adversely affect the reaction include ketones, esters, and aldehydes, amides, particularly N,N-disubstituted amides, halogenated hydrocarbons, ethers and tertiary amines.

The polyether polyol used to prepare the polyurethane is present in an amount ranging from about 0.10 to about 10.00, preferably from about 0.50 to about 5.00 and most preferably from about 0.85 to about 1.45 moles per mole of polyisocyanate. The polyether polyol is water soluble and may be a homopolymer or a block or random copolymer having the repeating unit:

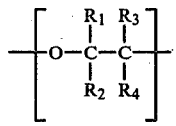

wherein $R_1$, $R_2$, $R_3$ and $R_4$ are independently selected from the group consisting of H, $CH_3$ and $C_2H_5$.

The polyether polyol must have a hydroxyl moiety substantially at each termini of the polyether chain and/or have one end of the polyether chain linked to a central molecule having at least one additional active hydrogen moiety and/or polyether chain attached thereto. This definition therefore includes low molecular weight polyurethane prepolymers having at least two hydroxyl moieties. In this regard, the polyether polyol may also be a three dimensional polyether polyol formed by the combination of at least one of the aforementioned homopolymer, block or random copolymers with a material having three or more moieties onto which the polyether chain may be formed or reacted. Such moieties include amine, carboxylic acid, and hydroxyl functions, and mixtures thereof. Representative examples of these tri- and higher functional materials include ethanolamines, glycerol, trimethylol propane, pentaerythritol, sorbitol, malic acid, tartaric acid, and citric acid. However, since the use of a three dimensional polyether polyol may lead to the formation of an insoluble, cross-linked gel which is unsuitable for the present invention, the amount of three dimensional forming material is maintained less than about 50 equivalent %, preferably less than about 20 equivalent %, and most preferably is negligible.

The average molecular weight of the polyether polyol is from about 4,000 to about 20,000, preferably from about 4,000 to about 14,000 and most preferably from about 6,000 to about 10,000. Polyether polyols having average molecular weights above about 20,000 form water insoluble polyurethane thickeners. Polyether polyols having average molecular weights of less than about 4000, while usable, produce inefficient thickeners with respect to those of the stated average molecular weight ranges.

Exemplary preferred polyether polyols useful for the present invention are polyethylene glycol, random and block copolymers of a group of diols consisting of ethylene glycol, propylene glycol, and butylene glycol, and polyether polyol adducts of glycerol, trimethylol propane, and pentaerythritol and mixtures thereof. The most preferred polyether polyol is polyethylene glycol.

As explained previously, to prepare the modified polyurethane, a modifying agent and a capping agent are employed. The modifying agent is present in an amount ranging from about 0.015 to about 3.40, preferably from about 0.025 to about 1.000 and most preferably from about 0.050 to about 0.300 moles per mole of polyisocyanate.

The modifying agent is incorporated into the polymer chain and creates linkages which are believed to be superior in hydrogen bonding when compared to the urethane linkages. The improved hydrogen bonding permits the modified polyurethane to thicken aqueous compositions in a highly efficient manner. More specifically, by incorporating the modifying agent into the polyurethane, the viscosity of a 4% by weight aqueous composition at 25° C. as measured by a Brookfield LVT Rotational Viscometer using a No. 4 spindle at 12 rpm can be increased from 8,000 to 15,000 cP to from about 12,000 to about 40,000 cP. A preferred range of viscosity obtained by modified polyurethane is from about 20,000 to about 30,000 cP under the same measurement conditions.

The modifying agent has the general formula:

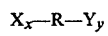

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting primary amino, secondary amino, carboxyl, hydroxyl, mercapto and mixtures thereof, the sum of (x+y) is an integer greater than 1 and x is at least 1. In the event that x is 2 or more, y may either be 0 or a larger number.

The group designated by R may be linear or branched aliphatic, cycloaliphatic or aromatic and the X and Y groups may occur at any position on the group. Preferably, the group contains 2 to 8 carbon atoms and most preferably the group contains 2 to 6 carbon atoms with an active hydrogen moiety located on the terminal carbon atoms. Other moieties which are not active hydrogen moieties may also be located on the group and include ketones, aldehydes, esters, amides, particularly N,N-disubstituted amides, halogens, tertiary amines and the like.

Especially preferred embodiments of the modified polyurethane are when X and Y are chosen from the group consisting of primary amino, secondary amino, carboxyl moieties and mixtures thereof, and a particularly preferred embodiment of the invention is when X and Y are primary amino.

Suitable examples of the polyurethane modifying agent include: hydrazine, α,ω-amino alkanes, such as 1,2-ethylenediamine, 1,3-diaminopropane, 1,4-diaminobutane, 1,5-diaminopentane, 1,6-diaminohexane (hexamethylenediamine), 1,7-diaminoheptane, 1,8-diaminooctane, 1,9-diaminononane, 1,10-diaminodecane, 1,12-diaminododecane and higher chain length diamines to the extent that they are capable of forming a modified polyurethane within the scope of this invention; cycloaliphatic amines, such as 1,4-diaminocyclohexane and isophorone diamine; aromatic amines, such as 1,4-diaminobenzene, 1,4-diaminonaphthalene, 1,8-diaminonaphthalene, N-phenyl-p-phenylenediamine and the like; polyamino compounds, such as diethylene triamine, triethylenetetramine, tetraethylene pentamine; substituted diamines, such as are prepared by Michael addition of acrylonitrile followed by reduction of the nitrile to a primary amino group, such as 3-cocoamino-1-propylamine, 3-tallowamino-1-propylamine, 3-(hydrogenated tallow)amino-1-propylamine, and N-alkyl-N,N bis(3-aminopropyl) amine, wherein the alkyl group contains one to 22 carbon atoms.

The polyurethane modifying agent may likewise be a dicarboxylic acid, such as oxalic acid, malonic acid, succinic acid, glutaric acid, adipic acid, pimelic acid, suberic acid, azelaic acid, sebacic acid, maleic acid, fumaric acid 1,10-decanedicarboxylic acid and the like, 1,2-, 1,3-and 1,4-benzenedicarboxylic acids, 1,4-cyclohexanedicarboxylic acid, 1,3-cyclopentanedicarboxylic acid, 1,3-cyclohexanedicarboxylic acid, etc.

The polyurethane modifying agent may also be an amino acid such as naturally occurring α-amino acids and a α-amino-ω-carboxylic acids. Examples include 2-aminoacetic acid, 2-aminopropanoic acid, 3-aminopropanoic acid, 2-aminobutyric acid, 4-aminobutyric acid, 6-aminohexanoic acid, 10-aminodecanoic acid, and aryl amino acids such as p-aminobenzoic acid.

Likewise, the polyurethane modifying agent may be hydroxylamine or an alkanol amine, such as ethanolamine, diethanolamine, 2-(ethylamino) ethanol, propanolamine, dipropanolamine and 6-aminohexanol.

Alternatively, the polyurethane modifying agent may be a hydroxy acid, such as 2-hydroxyacetic acid, 3-hydroxypropanoic acid, 4-hydroxybutanoic acid, 5-hydroxypentanoic acid, 6-hydroxyhexanoic acid, and 10-hydroxydecanoic acid. Also included in this class of polyurethane modifying agents are phenol carboxylic acids, such as salicylic acid, resorcylic acid, p-carboxyphenol and the like.

The polyurethane modifying agent may further be a mercaptoamine, such as 2-mercapto-1-aminoethane, 3-mercaptoaminopropane, 6-mercapto-1-aminohexane and the like. Also useful in the preparation of the polyurethane thickeners of this invention are mercaptocarboxylic acids, such as mercaptoacetic acid, 3-mercaptopropanoic acid, 6-mercaptohexanoic acid, 2-mercaptobenzoic acid, 4-mercaptobenzoic acid and the like.

Of the foregoing, the preferred polyurethane modifying agents are ethylene diamine, 1,6-diaminohexane, 1,10-diaminodecane, N-phenyl-p-phenylenediamine, succinic acid, suberic acid, sebacic acid, 1,10-decanedicarboxylic acid, 1,4-benzene-dicarboxylic acid, ethanolamine, 2-(ethylamino)ethanol, p-carboxyphenol and mixtures thereof.

Especially preferred modifying agents are α, ω-diaminoalkanes, dicarboxylic acids, amino carboxylic acids and mixtures thereof and the most preferred modifying agent is ethylene diamine.

More than one of the modifying compounds may be used in combination in the preparation of the modified polyurethane according to this invention and the term "modifying agent" encompasses such combinations unless otherwise stated.

The required amount of polyurethane modifying agent may include a portion of tri or higher functional material. However, if a tri or higher functional modifying agent is used, the amount must be limited in order to avoid gelation of the modified polyurethane into a water insoluble gel. Typically, this involves the use of less than than about 20 mole %, preferably less than about 10 mole % and most preferably a tri or higher functional modifying agent is absent from the total amount of modifying agent.

The amounts of tri or higher functional polyisocyanate, polyether polyol and modifying agent set forth in this specification should be viewed as general guidelines rather than absolute limits. Additional guidelines exist in the literature as exemplified in the section entitled: "Theory of Gelation" in "Advances in Chemistry Series (No. 34) Polymerization and Polycondensation Processes", edited by R. F. Gould, 1962, and published by the American Chemical Society, the contents of which are incorporated by reference. Whatever guideline is selected, the key criterion is that the total amount of tri or higher functional reactants must be less than the amount necessary to form a cross-linked, water insoluble gel. As is known in the art, the actual maximum amount of each reactant permitted so as to avoid gelation will vary depending on the chemical nature of the reactant and its functionality, the amounts, chemical natures and functionalities of the other reactants and the degree of polymerization of the overall modified polyurethane. Thus, the present invention will encompass an embodiment in which the amount of a particular reactant may be composed of a percentage of a tri or higher functional material which is greater than the amount stated in the specification if a water insoluble gel is not obtained and if an aqueous composition containing the modified polyurethane exhibits a decrease in Stormer viscosity upon thermal aging. Conversely, the present invention will not encompass an embodiment wherein a water insoluble gel is obtained even though the amount of tri or higher functional material may be below the stated limit.

As the name indicates, the capping agent is used to cap the ends of the polymer chain upon completion of the polymerization reaction. This prevents further reaction of the chain ends which might cause the polymer to become water insoluble. Additionally, the use of the capping agent reduces the toxicity of the polymer and increases the efficiency thereof by imparting a hydrophobic nature to the ends of the polymer chain.

The capping agent is present in an amount ranging from about 0.10 to about 10.00, preferably from about 0.50 to about 5.00 and most preferably from about 0.85 to about 1.45 moles per mole of polyisocyanate. The capping agent is a linear or branched aliphatic, cycloaliphatic or aromatic, preferably substantially water-insoluble compound containing a single functional group that is capable of reacting with the end group of the uncapped polymer chain. Depending on the reaction conditions and the amounts of the polyether polyol, polyisocyanate and polyurethane modifying agent, the monofunctional capping agent may be either (1) reactive with isocyanate moieties (i.e., contains an active hydrogen) or (2) reactive with active hydrogen moieties The capping agent may contain other moieties in addition to that moiety that functions to terminate the polymer chain growth. However, these moieties must not be reactive with either isocyanate or active hydrogen components under the reaction conditions used in the preparation of the modified polyurethane of this invention. Such moieties includes ketones, aldehydes, esters, hydrogenated hydrocarbons, tertiary amines, ethers and amides particularly N,N-disubstituted amides.

As stated earlier, the capping agent may be reactive with either an isocyanate moiety or an active hydrogen compound, and the selection of a particular capping agent is dependent on the reaction conditions and molar quantities of the other reactants. If the reaction conditions are chosen such that the uncapped modified polyurethane is substantially isocyanate-terminated, the capping agent should contain one active hydrogen moiety capable of reacting with an isocyanate moiety. Such active hydrogen moieties include hydroxyl, carboxylic acid, mercapto and primary and secondary amines. Representative examples of hydroxyl compounds that may be useful as capping agents include: octanol, decanol, dodecanol (lauryl alcohol), tetradecanol, hexadecanol, stearyl alcohol and 2-ethylhexanol; phenolics, such as phenol, cresol; alkylphenols, such as octylphenol, nonylphenol and dodecylphenol; and alkyl and aryl polyether alcohols, such as the polyethylene oxide adducts of lauryl alcohol, octylphenol and nonylphenol.

Examples of carboxylic acids that are useful as capping agents include: $C_8$ to $C_{22}$ alkyl carboxylic acids, such as octanoic acid, decanoic acid, dodecanoic acid, tetradecanoic acid, hexadecanoic acid, octadecanoic acid (stearic acid), eicosanoic acid, docosonoic acid; naturally occurring mixtures of acids, such as coco acids, tallow acids, rapeseed acids and the hydrogenated forms of these acids; aromatic acids, such as benzoic acid and naphthenoic acids; alkyl substituted aromatic acids, such as octylbenzoic acid and dodecylbenzoic acid; alicyclic acids, such as cyclopentane carboxylic acid, cyclohexanecarboxylic acid and cyclooctanecarboxylic acid; and alkoxypropyl acids derived from the Michael addition of alcohols to acrylic acid, such as 3-octyloxypropanoic acid, 3-dodecyloxypropanoic acid and 3-octadecyloxypropanoic acid.

Mercaptans useful as capping agents include octyl mercaptan, decylmercaptan, dodecylmercaptan, tetradecylmercaptan, hexadecylmercaptan, octadecylmercaptan and the like.

Both primary and secondary amines may be used as capping agents in the preparation of the modified polyurethane of this invention. Particularly useful are those amines that contain at least one alkyl chain having from 8 to 22 carbon atoms or an aromatic amine. If the amine is a secondary amine (i.e., has two organic radicals attached to a nitrogen), the two radicals may be the same or different. Suitable examples of primary amines useful in this invention are: octylamine, decylamine, dodecylamine, tetradecylamine, hexadecylamine, octadecylamine, eicosylamine and decosylamine, natural mixtures, such as cocoamine, tallow amine, soya amine, behenylamines; alkoxypropylamines, such as 3-octyloxypropylamine, 3-dodecyloxypropylamine, 3-stearyloxypropyl amine; aromatic amines, such as benzylamine, 1-naphthylamine and 2-naphthylamine. Examples of secondary amines include dioctylamine, didecylamine, didodecylamine, ditetradecylamine, dihexadecylamine, dioctadecylamine, dieicosyl amine, didocosylamine, methyloctylamine, methyldodecylamine, methyloctadecylamine, methylbenzylamine, allylbenzylamine, allyloctadecylamine, benzyloctadecylamine; and natural mixtures, such as dicocoamine, ditallowamine, bis (hydrogenated tallow) amine, disoyamine and the like. Also useful in the preparation of the modified polyurethane of this invention are the 3,3-dialkylamino-1-propylamine compounds, such as 3,3-dimethylamino-1-propylamine, 3,3-dioctyl-1-propylamine, 3,3-ditallow-1-propylamine and the like. Tertiary amines, however, are not useful as capping agents in the preparation of the modified polyurethane of this invention unless they contain another active hydrogen moiety, since tertiary amines do not contain an active hydrogen.

In those instances wherein the polymerization reaction results in a polymer chain terminating with an active hydrogen moiety, the capping agent is a mono functional compound reactive with active hydrogen moieties, and is preferably a monoisocyanate. This situation can be arranged by employing a total number of equivalents of active hydrogen moieties derived from the polyether polyol and modifying agent which is greater than the number of equivalents of isocyanate provided by the polyisocyanate. After this intermediate is formed, it may then be capped using a monoisocyanate in an amount such that the total number of equivalents of isocyanate derived from the polyisocyanate and monoisocyanate is equal to or greater than the total number of equivalents of active hydrogen.

Suitable examples of monoisocyanate capping agents useful in the preparation of the modified polyurethane of this invention are: $C_8$ to $C_{22}$ alkyl isocyanates, such as 1-isocyanatooctane, 1-isocyanatodecane, 1-isocyanatododecane, 1-isocyanatotetradecane, 1-isocyanatohexadecane, 1-isocyanatooctadecane, 1-isocyanatoeicosane and 1-isocyanatodocosane; cycloaliphatic isocyanates, such as isocyanatocyclohexane and isocyanotocyclododecane; aromatic isocyanates, such as phenyl isocyanate; and monoisocyanates formed by the selective reaction of active hydrogen compounds with polyisocyanate compounds such that only one isocyanate function remains, such as those which are formed by the reaction of $C_8$ to $C_{22}$ alcohols with isophorone diisocyanate.

Preparation of the modified polyurethane may be achieved by reacting the polyisocyanate, the polyether polyol and the modifying agent to form the uncapped modified polyurethane and simultaneously or, preferably, subsequently reacting this polymer with the capping agent. A further discussion of the modified polyurethane is set forth in the aforementioned concurrently filed, commonly assigned U.S. patent application Ser. No. 491,039 by Marvin T. Tetenbaum and Burlon C. Crowley and entitled "Water Dispersible, Modified Polyurethane".

The reaction is carried out under substantially anhydrous conditions and may be carried out either in the presence or absence of a solvent. If a solvent is used, it may constitute only a portion of the reaction mixture preferably from about 10 to about 70% and most preferably from about 10 to about 30% of the final reaction mixture. The solvent, if used, must itself be substantially anhydrous or made so prior to addition of any isocyanate compound to the reaction mixture. Suitable solvents useful in the preparation of the modified polyurethane of the present invention include: aromatic hydrocarbons, such as benzene, toluene, and xylenes; glycol solvents, such as glyme (glycol dimethyl ether) and diglyme; polar organic solvents, such as dimethyl formamide, methylsulfoxide, 1-methyl-2-pyrrolidinone, 1-butyl-2-pyrrolidinone, dimethylacetamide, gamma-butyrolactone, gamma butyrolactam, dioxane and acetonitrile.

The solvent, if used, must also be unreactive under the reaction conditions employed with the polyether polyol, the modifying agent or the polyisocyanate. The solvent may be water soluble or water insoluble. If a water soluble solvent is used as the reaction solvent, the modified polyurethane of this invention may be used without isolation prior to use (i.e., as prepared), if the water soluble solvent is compatible with the system in which the modified polyurethane is employed. On the other hand, if a water insoluble solvent is used in the preparation of the modified polyurethane, the solvent is preferably removed or the modified polyurethane is otherwise isolated prior to use.

The preferred solvent for the preparation of the modified polyurethane of this invention is toluene because (1) of its ability to azeotropically remove water from the reactants and the reaction mixture and (2) because the boiling point allows easy isolation of the modified polyurethane after the completion of the reaction. Most preferred, however, is to carry out the reaction in the absence of a solvent.

The reaction may be carried out in any vessel known to those of ordinary skill in the art as capable of handling the preparation of polyurethane. For example, the vessel may be enclosed with an outlet for gas, may have temperature control and agitation means and may be constructed of glass, stainless steel, or carbon steel. Into the vessel is charged the solvent, if any, and the polyether polyol. To ensure that the reaction proceeds in a substantially anhydrous environment, the polyether polyol and the solvent may be subjected to a drying step, such as by azeotropic drying, and the reaction may occur under an inert gas atmosphere, such as a nitrogen atmosphere.

The material is cooled to a temperature in the range of from about 20° to about 150° C. To facilitate the reaction, from about 0.005 to about 1.000% by weight of the total reactants of a conventional urethane catalyst is added. Such catalysts are exemplified by catalytically active compounds of bismuth, lead, tin, titanium, iron, antimony, uranium, cadmium, cobalt, thorium, aluminum, mercury, zinc, nickel, vanadium, cerium, as well as magnesium oxide, barium oxide, triethylene diamine, tertiary amines, pyrones, lactams and acids, with the preferred catalyst being dibutyltin dilaurate.

To the reaction vessel is then added the polyisocyanate and the modifying agent and the reaction is permitted to proceed at a temperature in the range of from about 20° to about 150° C. for from about 0.1 to about 48 hours. The reaction conditions are selected such that there are substantially no side reactions between two molecules of the modifying agent or between the modifying agent and the polyether polyol. Thus, for example, while the modifying agent may contain two carboxylic acid groups or a carboxylic acid group and a hydroxyl group, the reaction conditions (e.g., temperature) are selected such that the preparation of a polyester is substantially avoided.

In the event that gaseous by-products are produced, such as carbon dioxide during the formation of amide linkages, they may be removed from the reaction vessel. Upon completion of the polymerization step, the capping agent is added to the vessel and the mixture is maintained at a temperature of from about 20° to about 150° C. for from about 1 to about 48 hours to permit capping to occur. If a water insoluble solvent has been used, it is removed, such as by evaporation, the modified polyurethane is cooled to a temperature at or below its glass transition temperature in order to facilitate grinding e.g., to a temperature in the range of from about 25° to about −100° C., preferably from about 0° to about −100° C., such as by mixing it with dry ice or liquid nitrogen to solidify it and the solidified polymer is ground to a particle size suitable for incorporation into an aqueous composition.

It should be apparent that other (i.e., non-modified) polyurethanes can be prepared by a similar technique or other techniques known to those of ordinary skill in the art. However, in all instances, the polyurethane must satisfy the dispersibility and viscosity criteria set forth above.

The polyurethane may be combined with the stabilizing agent according to a variety of techniques. In particular, if the polyurethane has previously been solidified and ground to the appropriate size, the stabilizing agent may be provided in various forms so long as the resulting thickener has the constituents within the previously stated ranges. For example, the stabilizing agent may be in the form of a dry powder or as a slurry in water or organic solvent which is compatible with the stabilizing agent. The organic solvent may be one of those previously listed in the description of the preparation of the modified polyurethane or may be others since at this point in the process, substantially all of the isocyanate groups have been reacted. If the stabilizing agent is added in slurry form, the mixture may then be dried and pulverized according to the previously described technique to a particle size suitable for incorporation into an aqueous composition. On the other hand, if the stabilizing agent is added as a solid or a powder to the dried polyurethane, they may be dry mixed and, if necessary, ground together to the desired particle size.

In a more preferred embodiment of the invention, the stabilizing agent is added to the reaction mixture prior to the removal of any solvent, if used, and also prior to solidification and grinding. The stabilizing agent may be added to the reaction mixture prior to the completion of the reaction, but no advantage is gained by this technique. In this regard, if a capping agent is employed, the stabilizing agent is added subsequent to the reaction of the capping agent.

Irrespective of whether a solvent is employed in preparing the polyurethane, the stabilizing agent may be added as a powder. However, in the event that a solvent is used in the preparation of the polyurethane, the stabilizing agent may be added as a slurry in the same solvent or one that is compatible with that solvent. As stated in the previous paragraph, a variety of organic solvents may be used to form the slurry. In this embodiment, the thickener can be recovered by removing the solvent, such as by evaporation, cooling it to make it friable according to the previously described technique and then grinding the solid thickener to a particle size in the range from about 100 to about 1000, preferably from about 300 to about 400 microns.

As alternative embodiments of the present invention, the polyurethane may be separately recovered and added to the aqueous composition to be thickened simultaneously or at a different time from the addition of the stabilizing agent. In this regard, the polyurethane may itself be added as a dry powder, an aqueous gel or a slurry or solution in a water compatible solvent which may be the reaction media solvent. The order of addition of the polyurethane and the stabilizing agent is not determinative of the synergistic results obtained by the thickener of the present invention. In the event that the polyurethane and the stabilizing agent are to be added as a mixture to the aqueous composition, they may be first formed into a gel by mixing them simultaneously or separately into water at a temperature of from about 60° to about 70° C. The formed gel may then be mixed into the aqueous composition to be thickened.

The stabilizing agent imparts improved thermal stability to the polyurethane. In particular, by incorporating the thickener comprising the defined polyurethane and the stabilizing agent, the room temperature viscosity of an aqueous composition maintained at 140° F. over a one month period of time will be within 10 Krebs Units (KU), as determined by a Stormer Viscometer at low shear conditions according to ASTM D562-55, of the same composition after one day at room temperature. Preferably, the room temperature Stormer viscosity of the thermally aged composition is within 5 KU and most preferably is within 2 KU. The difference in Stormer viscosity under the stated conditions is a coating industry standard method for determining thermal viscosity stability. The stabilizing agent also improves the flow and leveling characteristics of an aqueous composition containing the thickener of the present invention.

The stabilizing agent of the present invention is a smectite-type having a cation exchange capacity of at least 75 milliequivalents per 100 grams of clay, 100% active clay basis. Particularly desirable types of clay are the naturally-occurring Wyoming varieties of swelling bentonites and like clays and hectorite, a swelling magnesium-lithium silicate clay.

The clays, especially the bentonite type clays, are preferably converted to the sodium form if they are not already in this form. In fact, if this is not done, the bentonite clays are not particularly suitable stabilizing agents. Conversion to the sodium form can conveniently be done by preparing an aqueous clay slurry and passing the slurry through a bed of cation exchange resin in the sodium form. Alternatively, the clay can be mixed with water and a soluble sodium compound, such as sodium carbonate, sodium hydroxide and the like, followed by shearing the mixture with a pugmill or extruder.

Smectite-type clays prepared naturally or synthetically by either a pneumatolytic or, preferably, a hydrothermal synthesis process can also be used to prepare the present organophilic clays. Representative of such clays are montmorillonite, bentonite, beidellite, hectorite, saponite and stevensite with the preferred clay being hectorite which is a particularly effective stabilizing agent even when compared to other smectite-type clays such as bentonite. These clays may be synthesized hydrothermally by forming an aqueous reaction mixture in the form of a slurry containing mixed hydrous oxides or hydroxides of the desired metal with or without, as the case may be, sodium (or alternate exchangeable cation or mixtures thereof) fluoride in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product.

The smectite-type clay has a surface area in the range of from about 400 to about 800, preferably from about 700 to about 800 m$^2$/g.

From the foregoing discussion, it should be apparent that the amount of stabilizing agent employed in a particular thermally stable thickener depends on the particular polyurethane and stabilizing agent selected. While the optimum amount will be within the ranges stated previously, it is normally determined by preparing several samples having different amounts of stabilizing agent and analyzing their Stormer viscosities before and after thermal aging. In any event, the stabilizing agent of the present invention will yield a thickener which forms an aqueous composition that possesses a decrease in Stormer viscosity upon thermal aging at 140° F. for one month which is less than that possessed using a like thickener without the stabilizing agent.

An interesting feature of the stabilizing agent of the present invention is that it is not simply a co-thickening agent. In other words, in contrast to a co-thickening agent such as fumed silica which will increase the initial Stormer viscosity of the aqueous composition, but which will actually cause a greater decrease after thermal aging, the stabilizing agent of the present invention can cause little or no increase in initial Stormer viscosity. It is upon thermal aging that the importance of the stabilizing agent becomes evident.

The thermally stable thickener of the present invention is a superior thickening agent for aqueous compositions. Typical aqueous compositions which may include the thermally stable thickener of the present invention are paints, coatings, synthetic plaster, cosmetics, personal care items, adhesives, sealants, inks, drilling fluids, packer fluids and any other aqueous composition requiring thickening and which may be exposed to elevated temperatures. One particularly useful environment is the area of water based paints.

The thickener is present in aqueous compositions in amounts ranging from about 0.005 to about 10.00%, preferably from about 0.01 to about 3.00 and most preferably from about 0.05 to about 1.00% by weight.

As should be apparent from the variety of useful applications, the aqueous composition may normally contain other known ingredients, such as pigments, surfactants, defoamers, preservatives, etc., in known combinations and amounts depending on the particular end use.

One important characteristic of the thickener of the present invention is the fact that it is water dispersible. That is, the thickener, like the polyurethane alone, readily disperses in most aqueous systems. In particular, the polyurethane thickener of this invention is infinitely compatible, once dispersed, with water over a wide range of temperatures without later separation upon standing.

The thermally stable thickener also exhibits a high level of efficiency as a thickening agent. As used in the context of the present invention, efficiency is determined by the increase in viscosity caused by the addition of a certain amount of the thickener to an aqueous composition. Thus, by dispersing 2% by weight of the defined thickener in water to form an aqueous gel, the room temperature viscosity can be increased to at least 150 cP, preferably at least 200 cP as measured by a Brookfield LVT Rotational Viscometer using a No. 1 spindle at 6 RPM.

In order to further illustrate the present invention and its advantages, the following specific examples and comparative examples are given. It should be understood that the present invention is not limited to the details set forth in those examples illustrating the present invention.

EXAMPLE 1

To a 500 ml, 3-necked glass flask equipped with a nitrogen sweep, thermometer, stirrer, Dean-Stark trap, condenser and bubbler and heating mantle is added 250 ml of toluene and 88.35 grams (0.01 mole) of polyethylene glycol obtained from Union Carbide which has a hydroxyl value of 12.7 and an average molecular weight of 8835 (0.02 OH equivalents). The mixture is azeotroped dry using a nitrogen sweep at about 110° C., the Dean-Stark trap is replaced by a septum arrangement and the mixture is cooled to 75° C.

To the flask is added 0.06 grams of dibutyltin dilaurate using a pipette and 1.4 grams of an 80/20 molar mixture of 2,4-and 2,6-tolylene diisocyanate (0.008 mole, 0.016 NCO equivalents) using a syringe. The reaction mixture is held for 20 hours at 75° C. and then 2.4 grams of 1-isocyanatooctadecane (0.008 moles, 0.008 NCO equivalents) is added and the resulting mixture is cooled to 60° C. for about 20 hours whereby a cloudy viscous solution results.

The solution is rotoevaporated at 90° C. under vacuum and is poured into a crystallization dish wherein it cools to produce a material having a paraffin like consistency. The material is placed in a blender with dry ice and is chopped into a fine powder having a maximum particle size of about 400 microns.

EXAMPLE 2

A stabilized thickener according to this invention is prepared by adding 4.0 g of dry, spray dried hectorite powder to 12.0 g of the dry urethane polymer product of Example 1.

EXAMPLE 3

The reaction vessel used in Example 1 is again employed. To the vessel is charged 73 grams of the same polyethylene glycol used in the previous examples with 230 ml of toluene.

The mixture is agitated and is azeotroped dry using a nitrogen sweep at about 110° C., the Dean-Stark trap is replaced by a septum arrangement and the mixture is cooled to 75° C.

To the vessel is separately added 1.39 grams of an 80/20 molar mixture of 2,4- and 2,6-tolylene diisocyanate, 0.06 grams of ethylene diamine and 0.06 grams of dibutyltin dilaurate. The reaction mixture is agitated for 2.5 hours at 75° C. During this time, three additions of octadecylisocyanate are made to the mixture. The first addition of 0.67 grams is made 0.5 hour after the addition of the diisocyanate, the ethylene diamine and the catalyst. The second addition of 0.67 grams is made 1.0 hour later and the third addition of 1.32 grams is made 1.0 hour after the second.

The temperature of the reaction mixture is then raised to 90° C. for 3.5 hours while agitation is continued.

The mixture is stirred for 15 minutes, poured over a plastic sheet and air dried for about 18 hours. The dry product is then crumbled into particles having a maximum size of about 400 microns.

EXAMPLE 4

The reaction vessel used in Example 1 is again employed. To the vessel is charged 73 grams of the same polyethylene glycol used in the previous examples with 230 ml of toluene.

The mixture is agitated and is azeotroped dry using a nitrogen sweep at about 110° C., the Dean-Stark trap is replaced by a septum arrangement and the mixture is cooled to 75° C.

To the vessel is separately added 1.39 grams of an 80/20 molar mixture of 2,4- and 2,6-tolylene diisocyanate, 0.06 grams of ethylene diamine and 0.06 grams of dibutyltin dilaurate. The reaction mixture is agitated for 2.5 hours at 75° C. During this time, three additions of octadecylisocyanate are made to the mixture. The first addition of 0.67 grams is made 0.5 hour after the addition of the diisocyanate, the ethylene diamine and the catalyst. The second addition of 0.67 grams is made 1.0 hour later and the third addition of 1.32 grams is made 1.0 hour after the second.

The temperature of the reaction mixture is then raised to 90° C. for 3.5 hours while agitation is continued. The reaction mixture is then cooled to 70° C. and a slurry containing 25.2 grams of hectorite in 50 ml of toluene is stirred in. An additional 20 ml of toluene is used to rinse the slurry container to ensure complete addition.

The mixture is stirred for 15 minutes, poured over a plastic sheet and air dried for about 18 hours. The dry product is then crumbled into particles having a maximum size of about 400 microns.

EXAMPLE 5

The process of Example 3 is repeated except that the polymer solids content is raised to 50% by weight. The modified polyurethane is recovered as a dry powdered product and is then dry blended with hectorite whereby the mixture is composed of 25% by dry weight of this stabilizing agent.

EXAMPLE 6

The process of Example 5 is repeated excepted that durinq the cool down period subsequent to reaction, hectorite is added to the reaction mixture as a dry powder such that the mixture is composed of 25% by dry weight of this stabilizing agent. Stirring is continued for 10 minutes. The resulting thickener is air dried and ground to a powder having a maximum size of about 400 microns.

EXAMPLE 7

A modified polyurethane is prepared according to the following formulation and process.

Reactor: Two quart sigma blade mixer, jacketed, manufactured by Paul O. Abbe, Inc.

Charge:

| Ingredient | Mw | Moles | Mole Ratio | Weight (grams) |
|---|---|---|---|---|
| PEG 8000* | 8000 | 0.31 | 9 | 2500 (2487 g PEG 13 g H$_2$O) |
| 80/20 2,4/2,6 TDI** | 174 | 0.2736 | 8 | 47.6 |
| Dibutyl Tin Dilaurate*** | 631.55 | — | — | 2.05 |
| Ethylene Diamine | 60.1 | 0.034 | 1 | 2.05 |
| Octadecyl Isocyanate**** | 295 | 0.31 | 9 | 91.10 |

*Flaked polyethylene glycol (7000–9000 mw) referred to as PEG and available under the name Carbowax 8000 from Union Carbide Company
**80/20 molar mixture of 2,4 and 2,6 tolylene diisocyanate available under the name TD-80 from Mobay Chemical Company.
***Available under the name Cotin 200 from Cosan Chemical Company.
****Available under the name Mondur O from Mobay Chemical Company.

PROCEDURE

1. The PEG is charged to the sigma blade reactor and melting is started by adding steam to the reactor jacket.
2. After 2 hours, 10 minutes, the PEG is observed to be melted and the agitation is started (44 and 34 rpm on the two sigma blades.
3. The reactor is linked up to the vacuum system through a condensate trap.
4. A vacuum of 21.5" to 22" Hg is pulled on the PEG for 2 hours, 5 minutes, maintaining the temperature at 95°–100° C. during the period to dewater the PEG. Water is reduced to 0.11% from an initial value of 0.5%.
5. After the dewatering step, the pressure in the reactor is zeroed (to atmospheric) with nitrogen and a slow nitrogen purge is placed on the reactor.
6. The PEG is cooled to 75° C. (in about 10 minutes) by running cold water through the reactor jacket.
7. The TDI is added and allowed to mix with the molten PEG for 10 minutes.
8. The dibutyltin dilaurate and ethylene diamine are added in that order.
9. The reaction is allowed to proceed for about 30 minutes during which time a large increase in viscosity is observed.
10. At the end of this period, 25% of the octadecyl isocyanate is added.
11. The mixture is reacted for about 1 hour at 75°–80° C.
12. Another 25% of the octadecyl isocyanate is added.
13. The mixture is reacted for about 1 hour at 80°–84° C.
14. The remaining 50% of the octadecyl isocyanate is added.
15. The temperature is increased to 90° C. and the reaction is allowed to continue for about 3½ additional hours.
16. The material is discharged and allowed to cool by mixing it with liquid nitrogen. The solidified modified polyurethane is then ground in a hammer mill to obtain a fine powder with 70% by weight being minus 100 mesh.

EXAMPLE 8

The dry powdered modified polyurethane of Example 7 is blended with dry hectorite powder to form a 75% modified polyurethane/25% hectorite mixture. Mixing is accomplished by adding the ingredients to a bottle and shaking.

To demonstrate the superior thermal stability of the thickener of the present invention, samples of the material prepared in accordance with the general procedures described in Examples 1 through 8 are incorporated into a high gloss acrylic screening composition. Also tested in the screening composition is a polyurethane thickener available under the name Rheology Modifier RM8 from Rohm & Haas Company.

The screening composition is a high gloss acrylic paint based on a published formula (Rohm & Haas IG-90-2). The composition is prepared from the listed components in the indicated amounts set forth in Table I. Formulations having substantially the same ratio of components are given in pounds, gallons, kilograms and liters.

TABLE I

| Component | Description | Pounds | Gallons |
|---|---|---|---|
| Tamol 731* | Anionic, polymer-type of dispersant available from Rohm & Haas Co. | 10.8 | 1.31 |
| Nopco NDW* | Liquid defoamer available from the Nopco Division of Diamond Shamrock Chemical Co. | 2.0 | 0.27 |
| Propylene glycol | | 85.0 | 9.86 |
| Titanox 2020* | Titanium dioxide pigment available from NL Industries, Inc. | 269.6 | 7.86 |
| Propylene glycol | | 32.6 | 3.78 |
| Rhoplex AC-490* | Aqueous, opaque dispersion of acrylic copolymers available from Rohm & Haas Co. | 555.9 | 62.71 |
| Super AD IT* | Mercurial preservative and fungicide available from Tenneco Chemicals, Inc. | 1.0 | 0.12 |
| Water | | 15.2 | 1.82 |
| Texanol* | 2,2,4-Trimethyl-1,3-pentanediol isobutyrate coalescent available from Eastman Chemical Products, | 15.7 | 1.98 |

TABLE I-continued

| Component | Description | Pounds | Gallons |
|---|---|---|---|
| | Inc. | | |
| Triton GR-7M* | Anionic surfactant available from Rohm & Haas Co. | 2.0 | 0.23 |
| Nopco NDW* | Liquid defoamer available from the Nopco Division of Diamond Shamrock Chemical Co. | 2.9 | 0.40 |
| Aqueous dispersion of thickener | | 80.6 | 9.66 |
| | | 1073.3 | 100.00 |

*Indicates trademarked item.

The screening composition is prepared as follows:

A high speed dispersator with RPM indicator is used with a powerstat to control rotational speed. A 2½" blade is used with a 4 liter stainless steel beaker. The blade is positioned about 1" to 2" from the bottom of the beaker during the grind.

The grind materials, which include Tamol 731, NOPCO NDW, propylene glycol and Titanox 2020 pigment are added to the beaker while stirring to ensure a homogeneous mix. Stirring is increased to 5400 rpm and the grind is continued for 15 minutes.

Stirring is slowed to under 2000 rpm and the propylene glycol, Rhoplex AC-490, Super AD IT, water, Texanol, Triton GR-7M and NOPCO NDW are added sequentially. Stirring is continued until the masterbatch is thoroughly mixed.

To one pint cans, 563 grams of the masterbatch is added. The same mixing equipment is used to stir in the aqueous dispersion of the thickener. Stirring is continued, at a rate so as not to allow air to be pulled into the mix, for five minutes. The paint is poured into two one half pint lined cans for testing.

The samples of the various comparative and inventive thickening agents and a sample of a hydroxyethyl cellulosic material available under the name QP4400 from Union Carbide Company which are incorporated in the standard screening composition are tested for ICI viscosity, gloss, leveling and room temperature Stormer viscosity after 1 day and 1 week, 2 weeks and, in most instances, 4 weeks at 140° F. The results of these tests and the difference in Stormer viscosity from the first day to the end of the test period (which is an accepted measurement of thermal stability) are set forth in Table II.

TABLE II

| Example | % Hectorite | Loading[1] PPHG | ICI[2] | Gloss[3] | Leveling[4] | STORMER VISCOSITY (KU)[5] After Aging at 140° F. | | | | |
|---|---|---|---|---|---|---|---|---|---|---|
| | | | | | | 1 day | 1 week | 2 weeks | 4 weeks | Δ KU |
| QP4400 | — | 2.0 | 1.3 | 65 | 5 | 83 | 93 | 94 | 94 | +11 |
| Example 1 | — | 1.2 | 0.6 | 73 | 8 | 87 | 82 | 82 | — | −5 (2 wks) |
| Example 2 | 25% | 1.5 | 0.6 | 71 | 7+ | 84 | 83 | 83 | — | −1 (2 wks) |
| Example 3 | — | 1.2 | 0.6 | 70 | 8− | 92 | 90 | 87 | 86 | −6 |
| Example 4 | 25% | 1.5 | 0.6 | 69 | 8− | 87 | 87 | 87 | 86 | −1 |
| Example 5 | 25% | 1.0 | 0.6 | 76 | 6+ | 88 | 86 | 86 | 86 | −2 |
| Example 6 | 25% | 1.0 | 0.6 | 76 | 7− | 89 | 89 | 89 | 90 | +1 |
| Example 7 | — | 0.9 | 0.6 | 81 | 7 | 98 | 90 | 90 | 90 | −8 |
| Example 8 | 25% | 1.5 | 0.6 | 82 | 8 | 87 | 91 | 91 | 91 | +4 |
| RM8 | — | 1.3 | 0.7 | 66 | 8 | 86 | 96 | 94 | 98 | +12 |

[1]Loading is determined on the basis of pounds of the thickener per 100 gallons.
[2]High shear viscosity is measured on the ICI Cone and Plate Viscosimerer (Research Equipment Limited, London) operating at about 10,000 sec.$^{-1}$ shear rate to simulate the shear applied to a paint during brushing. Generally, as ICI viscosity increased, film thickness ("build") also increases. Good build translates to increased hiding power of the paint and also contributes to improved flow and leveling.
[3]Gloss is determined by a Gardner Instruments Glossgard ® System 60 Glossmeter using ASTM D523-67.
[4]Leveling is measured on the basis of the screening composition containing QP 4400 which is given the arbitrary value of 5. It is marked by many uneven brush-marks showing in the 13 gram brush-out. As the value increases, a notable difference in the prominence of the brushmarks and evenness is obtained. A value of 8 indicates a smooth, even paint film with very few light brushmarks visible.
[5]Stormer viscosity is determined according to ASTM D562-55 under low shear conditions using a 9730-FID Series Stormer Viscometer and is in terms of Krebs Units (KU).

EXAMPLE 9

The process of Example 7 is repeated except that the polyethylene glycol is first dried azeotropically with toluene. The bulk of the toluene is removed before the polyethylene glycol is introduced into the reactor. Steps 6ff are identical to Example 7.

EXAMPLES 10–14

The dry powdered modified polyurethane of Example 9 is respectively blended with: dry hectorite powder; an aqueous slurry containing 3% by weight of bentonite; spray dried bentonite powder; ion exchanged and spray dried bentonite powder; and fumed silica powder. The resulting thickener is composed of 75% by weight of the modified polyurethane and 25% by weight of the additive.

The respective thickeners are formed in an aqueous slurry combined into the high gloss acrylic paint screening composition (IG-90-2) described above and tested for ICI viscosity, gloss, leveling, and room temperature Stormer viscosity after 1 day and 1 week, 2 weeks and 1 month at 140° F. The results of these tests and the difference in Stormer viscosity is set forth in Table III with the informational footnotes of Table II being equally applicable.

TABLE III

| Example | Additive | Ratio Polyurethane: Modifier | Aqueous Slurry Solids, % | Loading lb/100 gal in IG90-2 Formulation | ICI Viscosity | Gloss | Leveling | Stormer Viscosity (KU) | | | | Δ KU |
|---|---|---|---|---|---|---|---|---|---|---|---|---|
| | | | | | | | | 1 Day | 1 Week | 2 Weeks | 1 Month 140° F. | |
| Example 9 | None | — | 5 | 1.1 | 0.7 | 63 | 7+ | 89 | 83 | 82 | 81 | −8 |
| Example 10 | Hectorite | 3:1 | 6 | 1.5 | 0.7 | 62 | 8− | 81 | 81 | 82 | 79 | −2 |
| Example 11 | Bentonite, Slurry | 3:1 | 6 | 1.5 | 0.7 | 62 | 8+ | 82 | 82 | 78 | 76 | −6 |
| Example 12 | Bentonite, Spray Dried | 3:1 | 6 | 1.5 | 0.7 | 62 | 8 | 86 | 82 | 79 | 78 | −8 |
| Example 13 | Bentonite, Ion Exchanged & Spray Dried | 3:1 | 6 | 1.5 | 0.7 | 62 | 8 | 85 | 83 | 82 | 79 | −6 |
| Example 14 | Fumed Silica | 3:1 | 6 | 1.3 | 0.7 | 61 | 8 | 90 | 82 | 79 | 78 | −12 |

From these results, it can be readily seen that the thickener of the present invention comprised of the defined modified polyurethane and the defined stabilizing agent enables a thermally stable aqueous composition to be obtained which retains high levels of gloss and leveling.

The invention being thus described, it will be obvious that the same may be varied in many ways. Such variations are not to be regarded as a departure from the spirit and scope of the invention and all such modifications are intended to be included within the scope of the following claims.

What is claimed is:

1. A thermally stable thickener comprised of:
    (a) a stabilizing agent which is at least one smectite-type clay having a cation exchange capacity of at least 75 milliequivalents per 100 grams of clay, 100% active clay basis; and
    (b) a water dispersible polyurethane which, when mixed into an aqueous composition alone, results in a thickened aqueous composition that exhibits a decrease in room temperature Stormer viscosity after one month at 140° F., said stabilizing agent and said water dispersible polyurethane being in a dry weight ratio in the range of from 1:9 to 9:1.

2. The thermally stable thickener of claim 1 wherein an aqueous composition containing said thermally stable thickener exhibits a room temperature Stormer viscosity after one month at 140° F. which is less than 10 KU different from the room temperature Stormer viscosity of the same thickened aqueous composition after one day at room temperature.

3. The thermally stable thickener of claim 2 wherein the stabilizing agent is selected from the group consisting of a bentonite in the sodium form, hectorite and mixtures thereof.

4. The thermally stable thickener of claim 3 wherein the dry weight ratio of stabilizing agent to polyurethane is in the range of from about 2:3 to about 3:15.

5. The thermally stable thickener of claim 2 wherein the stabilizing agent is hectorite.

6. The thermally stable thickener of claim 5 wherein the dry weight ratio of stabilizing agent to polyurethane is in the range of from about 3:7 to about 1:4.

7. The thermally stable thickener of claim 2 wherein the thickener is in the form of a dry powder.

8. The thermally stable thickener of claim 7 wherein the powdered thickener has a particle size in the range of from about 100 to about 1000 microns.

9. The thermally stable thickener of claim 2 wherein the room temperature Stormer viscosity after one month at 140° F. is less than 5 KU different from the room temperature Stormer viscosity of the same thickened aqueous composition after one day at room temperature.

10. The thermally stable thickener of claim 1 wherein the water dispersible polyurethane is the reaction product of:
    (a) polyisocyanate;
    (b) polyether polyol in an amount ranging from about 0.10 to about 10.00 moles per mole of polyisocyanate;
    (c) modifying agent in an amount ranging from about 0.015 to about 3.400 moles per mole of polyisocyanate, said modifying agent having the formula $$X_x\text{—R—}Y_y$$

wherein R represents a group containing from 0 to 10 carbon atoms, X is a group containing at least one active hydrogen moiety selected from the group consisting of primary amino, secondary amino, carboxyl and mixtures thereof, Y is a group containing at least one active hydrogen moiety selected from the group consisting of primary amino, secondary amino, carboxyl, hydroxyl, mercapto and mixtures thereof, the sum of $(x+y)$ is an integer greater than 1 and x is at least 1 wherein the polyisocyanate, the polyether polyol and the modifying agent are used to form the polymer chain; and
    (d) capping agent which is reactive with the reaction product of the polyisocyanate, the polyether polyol and the modifying agent and which is present in an amount sufficient to cap the reaction product of the polyisocyanate, the polyether and the modifying agent.

11. The thermally stable thickener of claim 10 wherein an aqueous composition containing said thermally stable thickener exhibits a room temperature Stormer viscosity after one month at 140° F. which is less than 5 KU different from the room temperature Stormer viscosity of the same thickened aqueous composition after one day at room temperature.

12. The thermally stable thickener of claim 11 wherein the polyisocyanate is selected from the group consisting of 1,6-hexamethylene diisocyanate, 1-isocyanato-3-isocyanato-methyl-3,5,5-trimethyl cyclohexane, 2,4-tolylene diisocyanate, 2,6-tolylene diisocyanate and mixtures thereof.

13. The thermally stable thickener of claim 11 wherein the polyether polyol is a homopolymer or a block or random copolymer having the repeating unit:

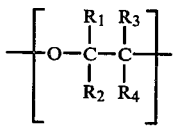

wherein $R_1$, $R_2$, $R_3$ and $R_4$ are independently selected from the group consisting of H, $CH_3$ and $C_2H_5$.

14. The thermally stable thickener of claim 11 wherein the modifying agent is selected from the group consisting α,ω-diaminoalkanes, dicarboxylic acids, aminocarboxylic acids and mixtures thereof.

15. The thermally stable thickener of claim 11 wherein the capping agent is a monoisocyanate.

16. The thermally stable thickener of claim 11 wherein the stabilizing agent is selected from the group consisting of bentonite in the sodium form, hectorite and mixtures thereof.

17. The thermally stable thickener of claim 16 wherein the stabilizing agent is hectorite.

18. The thermally stable thickener of claim 17 wherein an aqueous composition containing said thermally stable thickener exhibits a room temperature Stormer viscosity after one month at 140° F. which is less than 2 KU from the room temperature Stormer viscosity of the same thickened aqueous composition after one day at room temperature.

19. A thickened aqueous composition including from about 0.005 to about 10.000% by weight of a thermally stable thickener, said thermally stable thickener being comprised of:
  (a) a stabilizing agent which is at least one smectite-type clay having a cation exchange capacity of at least 75 milliequivalents per 100 grams of clay, 100% active clay basis; and
  (b) a water dispersible polyurethane which, when mixed into an aqueous composition alone, results in a thickened aqueous composition that exhibits a decrease in room temperature Stormer viscosity after one month at 140° F., said stabilizing agent and said water dispersible polyurethane being in a dry weight ratio in the range of from 1:9 to 9:1.

20. The thickened aqueous composition of claim 19 wherein the stabilizing agent is hectorite.

21. The thickened aqueous composition of claim 20 wherein the thermally stable thickener is present in an amount ranging from about 0.01 to about 3.00% by weight of the aqueous composition.

22. The thickened aqueous composition of claim 21 wherein said thickened aqueous composition containing said thermally stable thickener exhibits a room temperature Stormer viscosity after one month at 140° F. which is less than 5 KU different from the room temperature Stormer viscosity of the same thickened aqueous composition after one day at room temperature.

23. A method of increasing the viscosity of an aqueous composition comprising mixing the aqueous composition with from about 0.005 to about 10.000% by weight of a thermally stable thickener which is comprised of:
  (a) a stabilizing agent which is at least one smectite-type clay having a cation exchange capacity of at least 75 milliequivalents per 100 grams of clay, 100% active clay basis; and
  (b) a water dispersible polyurethane which, when mixed into an aqueous composition alone, results in a thickened aqueous composition that exhibits a decrease in room temperature Stormer viscosity after one month at 140° F., said stabilizing agent and said water dispersible polyurethane being in a dry weight ratio in the range of from 1:9 to 9:1.

24. The method of claim 23 wherein the thermally stable thickener is in the form of a mixture of dry powders of the stabilizing agent and the water dispersible polyurethane.

25. The method of claim 23 wherein the thermally stable thickener is in the form of a preformed aqueous gel.

26. The method of claim 23 wherein the thermally stable thickener is mixed with the aqueous composition by separately mixing in the stabilizing agent and the modified polyurethane.

27. The method of claim 26 wherein the stabilizing agent and the modified polyurethane are in the form of dry powders.

28. The method of claim 23 wherein the thermally stable thickener is mixed with the aqueous composition by simultaneously mixing in the stabilizing agent and the modified polyurethane.

29. The method of claim 23 wherein the stabilizing agent is selected from the group consisting of bentonite in the sodium form, hectorite or mixtures thereof.

30. The method of claim 29 wherein the stabilizing agent is hectorite.

* * * * *